United States Patent
Britton

(10) Patent No.: US 12,259,795 B2
(45) Date of Patent: Mar. 25, 2025

(54) METHOD AND SYSTEMS FOR PROVIDING BACK UP FOR A DATABASE

(71) Applicant: Sage Global Services Limited, Tyne and Wear (GB)

(72) Inventor: Daryl Vaughan Britton, New Castle Upon Tyne (GB)

(73) Assignee: Sage Global Services Limited, Tyne And Wear (GB)

( * ) Notice: Subject to any disclaimer, the term of this patent is extended or adjusted under 35 U.S.C. 154(b) by 0 days.

(21) Appl. No.: 17/980,167

(22) Filed: Nov. 3, 2022

(65) Prior Publication Data

US 2023/0142887 A1    May 11, 2023

(30) Foreign Application Priority Data

Nov. 10, 2021   (GB) .................................. 2116170

(51) Int. Cl.
*G06F 16/23*   (2019.01)
*G06F 11/14*   (2006.01)

(52) U.S. Cl.
CPC ...... *G06F 11/1469* (2013.01); *G06F 11/1464* (2013.01); *G06F 16/235* (2019.01); *G06F 16/2365* (2019.01); *G06F 2201/84* (2013.01)

(58) Field of Classification Search
CPC .............. G06F 11/1469; G06F 16/235; G06F 16/2365; G06F 11/1464; G06F 2201/84
USPC ......................................................... 707/649
See application file for complete search history.

(56) References Cited

U.S. PATENT DOCUMENTS

| | | | |
|---|---|---|---|
| 7,290,015 B1* | 10/2007 | Singhal | G06F 11/1469 |
| 9,152,643 B2* | 10/2015 | Whitehead | G06F 11/1448 |
| 10,489,248 B1* | 11/2019 | Javadekar | G06F 3/065 |
| 10,983,719 B1* | 4/2021 | Williams | G06F 3/0604 |
| 11,042,503 B1* | 6/2021 | Vig | G06F 11/1451 |
| 11,343,314 B1* | 5/2022 | Muniswamy-Reddy | H04L 47/70 |
| 11,360,689 B1* | 6/2022 | Grunwald | G06F 11/1451 |
| 2007/0088970 A1* | 4/2007 | Buxton | G06F 11/1471 714/E11.13 |
| 2008/0162590 A1* | 7/2008 | Kundu | G06F 11/1662 |
| 2008/0183991 A1* | 7/2008 | Cosmadopoulos | H04L 67/142 711/E12.103 |
| 2010/0145909 A1 | 6/2010 | Ngo | |
| 2012/0233123 A1 | 9/2012 | Shisheng et al. | |
| 2014/0181051 A1* | 6/2014 | Montulli | H04L 67/1097 707/679 |

(Continued)

OTHER PUBLICATIONS

British Search Report dated Apr. 28, 2022, in connection with British Application No. GB2116170.8.

*Primary Examiner* — Cam Linh T Nguyen
(74) *Attorney, Agent, or Firm* — Wolf, Greenfield & Sacks, P.C.

(57) ABSTRACT

There is provided a database system and a method for providing a backup for a database. A database is stored at a primary server. A snapshot of the database is communicated from the primary server to a secondary server, and the snapshot of the database is stored at the secondary server. At least one request to make a change to the database is received at a publisher server, and the publisher server transmits the at least one request to each of a message queue associated with the primary server and a message queue associated with the secondary server. The database at the primary server is updated by processing each requested change.

20 Claims, 8 Drawing Sheets

(56) References Cited

U.S. PATENT DOCUMENTS

| | | | | |
|---|---|---|---|---|
| 2014/0181579 A1* | 6/2014 | Whitehead | ............ | G06F 16/21 |
| | | | | 707/654 |
| 2017/0004051 A1* | 1/2017 | Ren | ................ | G06F 11/1464 |
| 2018/0143881 A1* | 5/2018 | Singer | ............... | G06F 11/2094 |
| 2019/0171532 A1* | 6/2019 | Abadi | ............... | H04L 67/1095 |
| 2020/0327122 A1* | 10/2020 | Aston | ................ | G06F 16/367 |

* cited by examiner

METHOD AND SYSTEMS FOR PROVIDING BACK UP FOR A DATABASE

RELATED APPLICATIONS

Foreign priority benefits are claimed under 35 U.S.C. § 119(a)-(d) or 35 U.S.C. § 365(b) of British application number 2116170.8, filed Nov. 10, 2021, the contents of which are incorporated herein by reference in their entirety.

This invention relates to providing a backup for a database system, in particular to facilitate disaster recovery for the database system. Aspects of the invention relate to a method, to a server, to computer software and to a database system.

BACKGROUND

Remote access can be provided, such as in web or cloud applications, from a client device to a database. The database is hosted at a primary region of a database system and may be accessed via a network such as the Internet. The primary region may comprise any electronic device with memory for storing the database such as a server computer, or a collection of server computers in the case of a cloud or distributed application. A technical fault such as power loss at the primary region can leave the database susceptible to data loss or data corruption. An event which causes data corruption or loss at the primary region is referred to as a Disaster Recovery (DR) event. It is therefore desirable to provide measures to mitigate the effects of any data loss at the primary region in the case of a DR event. One method of reducing the risk of data loss includes providing a backup of the database at a secondary region separate from the primary region, such that a copy of the database is available at the secondary region. Then in the case of a DR event, the database system can switch to utilise the secondary region to provide the database service.

Various DR methods may be used to provide the copy of the database at the secondary region. In a snapshot-based DR method, periodic snapshots of the database at the primary region are taken and transmitted to the secondary region. However, changes may be made to the database at the primary region between snapshots, and thus if a DR event occurs after a change is made and before the subsequent snapshot, the change may be lost. In a distributed system, time drift can cause snapshots to be misaligned between different regions and thus this may also cause corruption of the database. This problem may be mitigated by taking more frequent snapshots. However, taking more frequent snapshots is resource intensive as communication of the snapshot between regions can take a long time in the case of a large database.

An alternative DR method is active-active replication or synchronous or asynchronous multi-master replication. However, the application of active-active or multi-master replication is limited to supported database technologies, and thus it is not widely applicable to existing database systems. Furthermore, all regions must be actively processing changes to the database, which is costly and resource intensive.

It is an object of the invention to provide a solution to one or more of the problems associated with the prior art.

BRIEF SUMMARY OF THE DISCLOSURE

In accordance with the present inventions there is provided a method, computer software, a secondary server and a database system as defined in the appended claims.

According to a first aspect there is provided a computer-implemented method of providing a backup for a database system, the method comprising: storing, at a primary server, a database; communicating, from the primary server to a secondary server, a snapshot of the database, and storing the snapshot of the database at the secondary server; receiving, at a publisher server, at least one request to make a change to the database; transmitting the at least one request from the publisher server to each of a message queue associated with the primary server and a message queue associated with the secondary server; and updating the database at the primary server by processing each requested change.

Beneficially, the present invention may be applied to any snapshot based system, and thus does not require a specific type of database technology to work. Furthermore, zero data loss is ensured as all requests are transmitted to message queues at each of the primary and secondary servers. The transmitting may be implemented using any message broker technology. In some cases, the transmitting may be indirect. For example, the publisher server may transmit the request to an intermediary such as an intermediary event bus, and the intermediary may transmit the request to each message queue. Providing the message queue at each server means that even if the changes are not processed at the secondary server, they may be retrieved from the message queue in the case of a disaster recovery event at the primary server, and thus are not lost. At least a portion of the processor at the secondary server may be deactivated, and thus the requested change is not actively processed to update the snapshot at the secondary server. Thus, the present invention is highly scalable and resource efficient.

The request may be received after the snapshot is communicated. Even if a disaster recovery event occurs after the request has been processed at the primary server, the associated change may be recovered from the message queue at the secondary server. In some embodiments, a plurality of requests may be received, and each request may be transmitted to each message queue and processed by the primary server.

Each message queue may be hosted at each respective server, that is the message queue associated with the primary server may be hosted at the primary server, and the message queue associated with the secondary server may be hosted at the secondary server.

The method may comprise receiving, at the secondary server, an indication of a disaster recovery event at the primary server; retrieving from the message queue associated with the secondary server, the at least one request; and in response to receiving the indication of the disaster recovery event, updating the snapshot of the database at the secondary server by processing the at least one requested change. Thus, the secondary server can fully reconstruct the most up to date version of the database. Beneficially, said processing is only performed following a disaster recovery event, to minimise the processing resources required at the secondary server. Optionally, the updated snapshot may be retrieved by the primary server from the secondary server once the primary server is functional. Updating the snapshot of the database at the secondary server may comprise processing each request transmitted to the message queue since communication of the snapshot. Each request may be idempotent, in order to ensure duplication of changes already incorporated in the snapshot is avoided.

Optionally, transmitting the request comprises transmitting the request from the publisher server using a fan-out mechanism. The fan-out mechanism may comprise a publish-subscribe (pub/sub) mechanism.

Optionally, the publisher server is comprised in the primary server. That is, the publisher server and the primary server may be implemented on common hardware.

Optionally, a current snapshot of the database is periodically communicated from the primary server to the secondary server. The current snapshot may be communicated after a predetermined period or interval, such as one hour, two hours, thirty minutes, fifteen minutes, or the like.

The method may comprise communicating the snapshot to one or more additional secondary servers; and transmitting the at least one request from the publisher server to a respective message queue associated with each additional secondary server.

In some embodiments, the primary server comprises a distributed server system. The primary server may be located at a first geographic region and the secondary server may be located at a second geographic region different to the first geographic region.

According to another aspect there is provided computer software which, when executed, is arranged to perform a method according to the aspect above.

According to another aspect there is provided a secondary server for providing a backup for a database system, the secondary server system comprising: a communication module arranged to receive, from a primary server, a snapshot of a database stored at the primary server; a memory device arranged to store the snapshot of the database and a message queue; and one or more processors configured to receive at least one request to make a change to the database and store the at least one request in the message queue. In the absence of a disaster recovery event, the request is stored in the message queue without being processed to update the snapshot.

According to another aspect there is provided a database system for providing a backup database, the database system comprising: a primary server configured to store a database; a secondary server configured to store a snapshot of the database, wherein the primary server is configured to communicate the snapshot of the database to the secondary server; and a publisher server configured to receive at least one request to make a change to the database and transmit the at least one request to each of a message queue associated with the primary server and a message queue associated with the secondary server; wherein the primary server is configured to update the database by processing each requested change.

Optionally, the secondary server is configured to: receive an indication of a disaster recovery event at the primary server; retrieve from the message queue associated with the secondary server, the at least one request; and in response to receiving the indication of the disaster recovery event, update the snapshot of the database at the secondary server by processing the at least one requested change. The secondary server may be configured to update the snapshot of the database by processing each request transmitted to the message queue since communication of the snapshot.

Optionally, the publisher server is configured to transmit the request using a fan-out mechanism. The fan-out mechanism may comprise a publish-subscribe (pub/sub) mechanism.

Optionally, the publisher server is comprised in the primary server. Optionally, the primary server is configured to periodically communicate a current snapshot of the database to the secondary server.

The database system may comprise one or more additional secondary servers, wherein the primary server is configured to communicate the snapshot to each of the one or more additional secondary servers; and the publisher server is configured to transmit the at least one request from the to a respective message queue associated with each additional secondary server.

The primary server may comprise a distributed server system. The primary server may be located at a first geographic region and the secondary server may be located at a second geographic region different to the first geographic region.

BRIEF DESCRIPTION OF THE DRAWINGS

Embodiments of the invention are further described hereinafter with reference to the accompanying drawings, in which.

DETAILED DESCRIPTION

Figure 1:
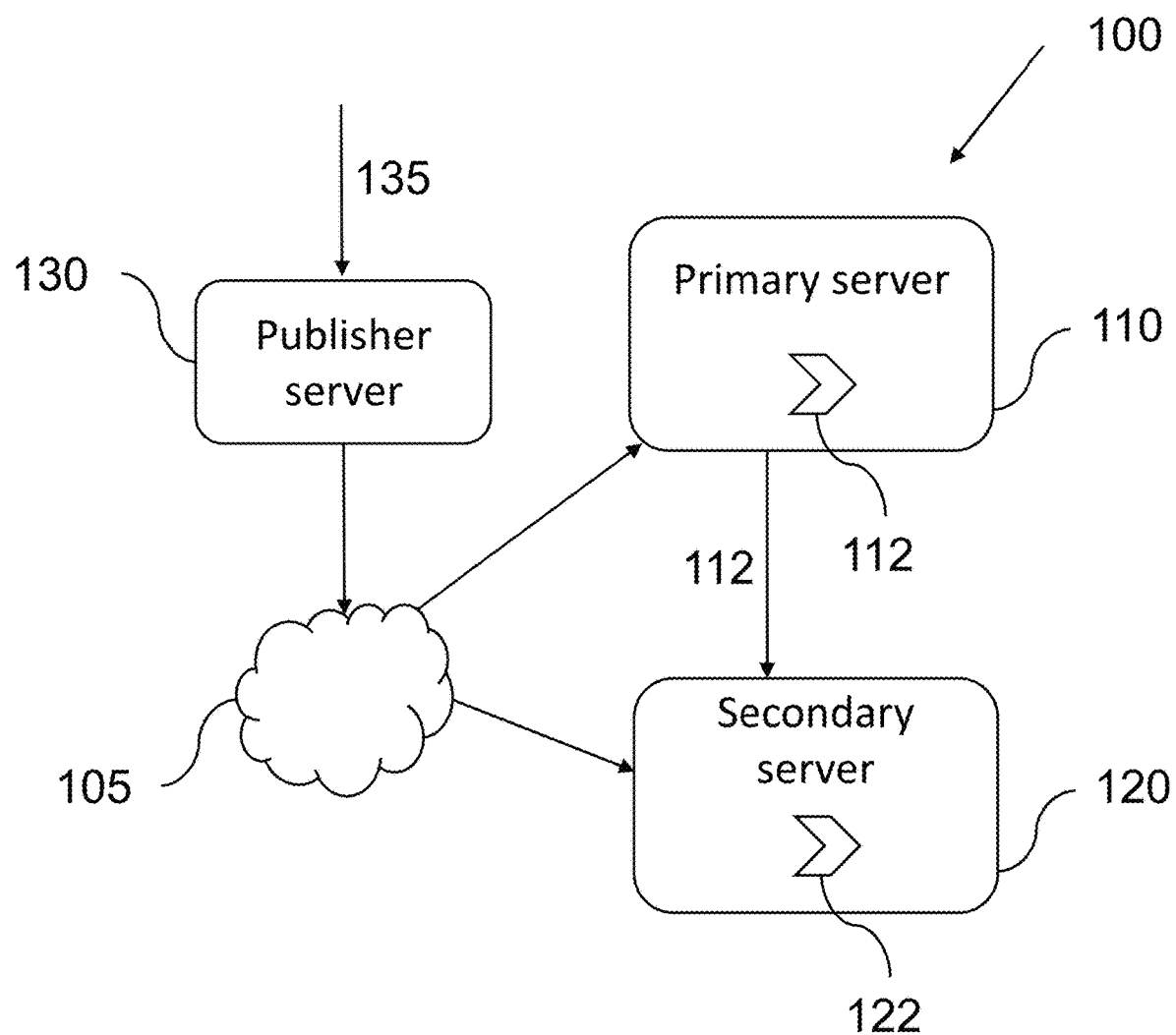
FIG. 1 is a schematic illustration of a database system 100.

Referring to FIG. 1, there is shown a block diagram of a database system, indicated generally by the reference numeral 100. The system 100 comprises a primary server 110 configured to store a database 112. The primary server 110 may comprise any electronic device or plurality of devices operable to store the database 112 and communicate with other elements of the system 100, as will be explained. Although the primary server 110 is illustrated as a single device, in some embodiments the primary server 110 may comprise a plurality of electronic devices such as server computers communicable over a network, such as in a distributed or cloud application. As such, when reference is made to the primary server 110, it will be appreciated that in some embodiments this will be interpreted as a collection of devices performing the function of the primary server 110.

The system 100 comprises a secondary server 120 configured to store a snapshot 122, or copy, of the database 112. The secondary server 120 is communicably coupled to the primary server 110 such that the primary server 110 can transmit data to the secondary server 120 over one or more networks 105, such as the Internet. The primary server 110 may be located in a primary region, and the secondary server 120 may be located in a secondary region, wherein the primary region and secondary region are geographically separated. That is, the primary server 110 and secondary server 120 operate independently and do not share electronic circuitry. Thus, the secondary server 120 may act as an effective backup if the primary server 110 is damaged. Geographic separation between the primary server 110 and secondary server 120 further provides a safeguard against local power outages, such that the secondary server 120 is unlikely to be affected by any local power disruption at the location of the primary server 110. The primary server 110 is configured to communicate a copy of the database 112 to the secondary server 120, and the secondary server is then configured to store the copy of the database 112 as the snapshot 122. The communication of the copy of the database 112 from the primary server 110 to the secondary server 120 is performed at intervals, such that the snapshot 122 is regularly updated. The intervals may be defined to be periodic, such that a copy is communicated at regular intervals such as every five minutes, 30 minutes, hour, two hours, or the like. The duration of the interval may be tailored depending on the size of the database, and the time required to perform the communication, to optimise resource allocation.

The copy of the database 112 communicated to the secondary server 120 may be complete, i.e., the copy communicated may comprise the entire database 112, or it may be incremental and comprise only portions of the database 112 changed during the interval since the last snapshot 122 was stored.

As with the primary server 110, the secondary server 120 may comprise any electronic device or plurality of devices operable to store the snapshot 122 and communicate with the primary server 110. Although the secondary server 120 is illustrated as a single device, in some embodiments the secondary server 120 may comprise a plurality of electronic devices such as server computers communicable over a network, such as in a distributed or cloud application. As such, when reference is made to the secondary server 120, it will be appreciated that in some embodiments this will be interpreted as a collection of devices performing the function of the secondary server 120.

One or more clients (not shown) may be provided with access to the database 112, such as via a web application or cloud application executed at the primary server 110. The clients may access the database 112 remotely over a network 105 such as the Internet. Each client may be permitted to edit the database 112, and thus may communicate a request 135 to make a change to the database 112, for example to add, remove or edit a portion of the database 112.

Typically, such a request 135 would be communicated to the primary server 110 from the client device and the primary server 110 would process the requested change to edit the database 112. In a snapshot based system, those requested changes would not be sent to the secondary server 120, and the snapshot 122 stored at the secondary server would only be updated to reflect the requested change following the next snapshot being transmitted from the primary server 110 to the secondary server 120. In a system using active-active replication, the request may be communicated from the primary server 110 to the secondary server 120 and processed at the secondary server 120, such that each requested change is processed at both servers. Typically, for asynchronous active-active replication there is still some delay between processing the change at the primary server 110 and processing the change at the secondary server 120. Furthermore, the processing infrastructure at the secondary server 120 must remain active at all times in such an active-active replication system in order to actively process all changes as they are received. Thus, the processing costs are high. Multi-master replication systems function analogously to active-active replication systems, with the distinction that multi-master replication systems allow requests to be communicated from any server in the system (i.e., any server in the system can function as the primary server). Thus, multi-master replication systems suffer from the same problems as active-active replication systems.

According to the present invention, there is provided a mechanism by which any database system supporting snapshots may be adapted to ensure zero data loss in the case of a disaster recovery (DR) event occurring between snapshots. Furthermore, according to the present invention the changes do not need to be actively processed at the secondary server, thus reducing processing costs at the secondary server compared to multi-master replication systems. This is particularly beneficial for database systems wherein large volumes of requests are processed, both in order to reduce the processing required for each request and in order to ensure zero data loss and data consistency in a distributed application.

To achieve this aim, the system 100 implements a message broker system to transmit requests 135 to the primary server 110 and secondary server 120. Any suitable message broker system may be implemented. In particular, the message broker system may comprise a fan-out mechanism such as a publish-subscribe mechanism (pub/sub). Whilst reference is made to a publish-subscribe mechanism according to some embodiments, it will be appreciated that an alternative message broker system may also be used. The system 100 comprises a publisher server 130 which is configured to act as a publisher in the publish-subscribe mechanism. The publisher server 130 may practically be integrated with the primary server 110, i.e. the publisher server 130 and primary server 110 may form part of the same electronic device or devices. However, the publisher server 130 is functionally independent of the primary server 110 hosting the database 112.

The publisher server 130 comprises a memory device, a processor, and a communication module (detail not shown). The publisher server 130 is configured to receive the request 135 to make a change to the database and execute, by the processor, a publisher module to transmit the request as a message via the message broker system.

Figure 2:
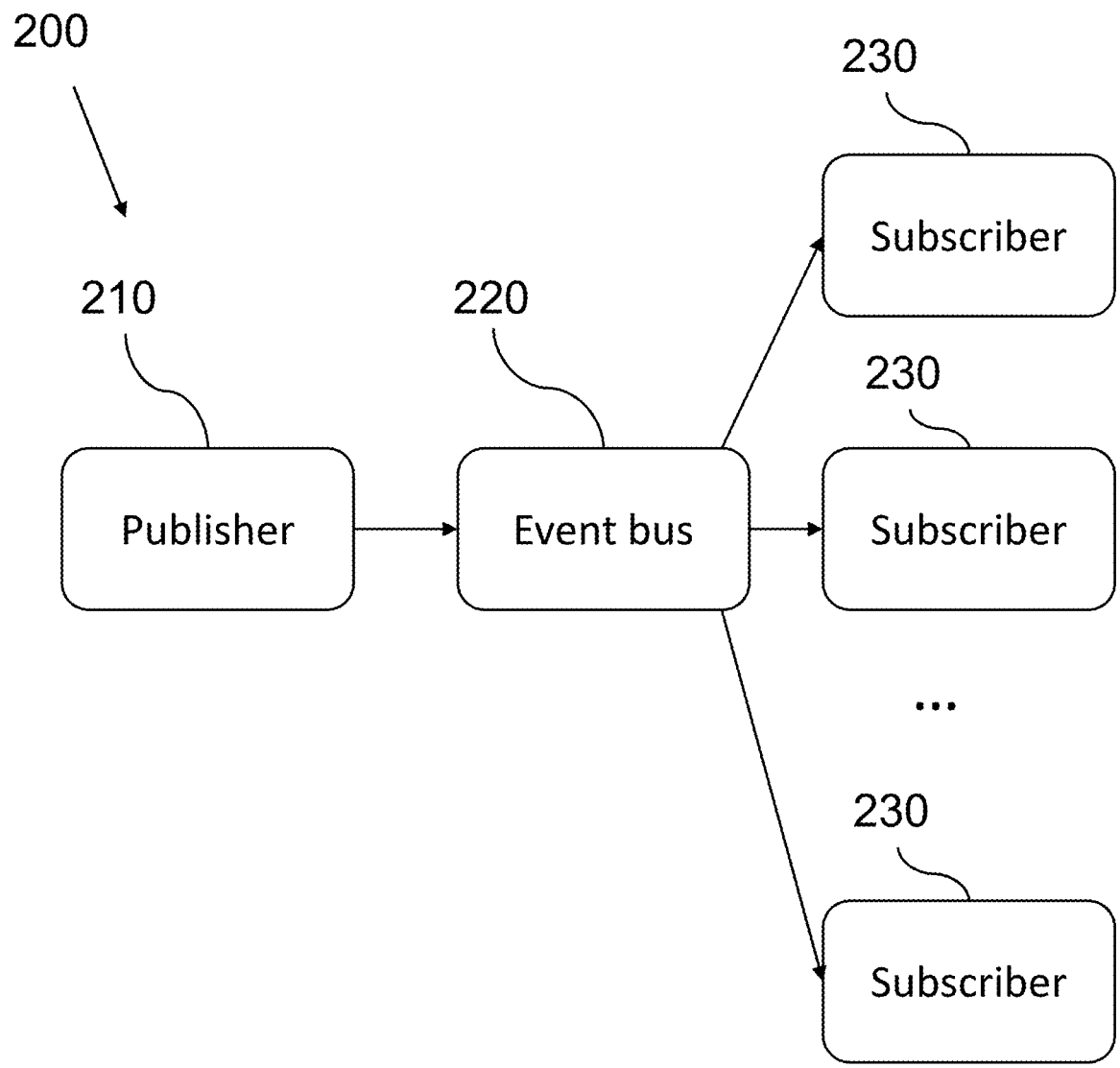
FIG. 2 illustrates a message broker system 200.

With reference to FIG. 2, there is shown a schematic illustration of a message broker system in the form of a publish-subscribe system 200. A publisher 210, such as executed by the publisher server 130, is arranged to transmit a message to an event bus 220 which acts as an intermediary message broker. The event bus 220 may be implemented locally, e.g., on the publisher server 130, or remotely from the publisher 210 on an external device via which the publisher 210 is able to communicate over one or more networks such as the Internet. The communication between elements of the system in a publish-subscribe mechanism may be implemented in the form of one or more application programming interfaces (APIs). One or more subscribers 230 are configured to subscribe to receive messages from the event bus 220 associated with the publisher 210. The event bus 220 is then configured to manage a list of subscribers 230 and transmit messages received from the publisher 210 to each subscriber 230. In this way, the publisher 210 and the subscribers 230 are decoupled and the publisher 210 does not need to maintain any knowledge of the subscribers 230. Beneficially, publish-subscribe systems are a highly scalable and resource efficient mechanism by which messages can be distributed. According to the present invention, each of the primary server 110 and secondary server 120 act as subscribers 230 in the publish-subscribe system 200 and receive each request 135 as a message via the publish-subscribe system 200.

Figure 3:
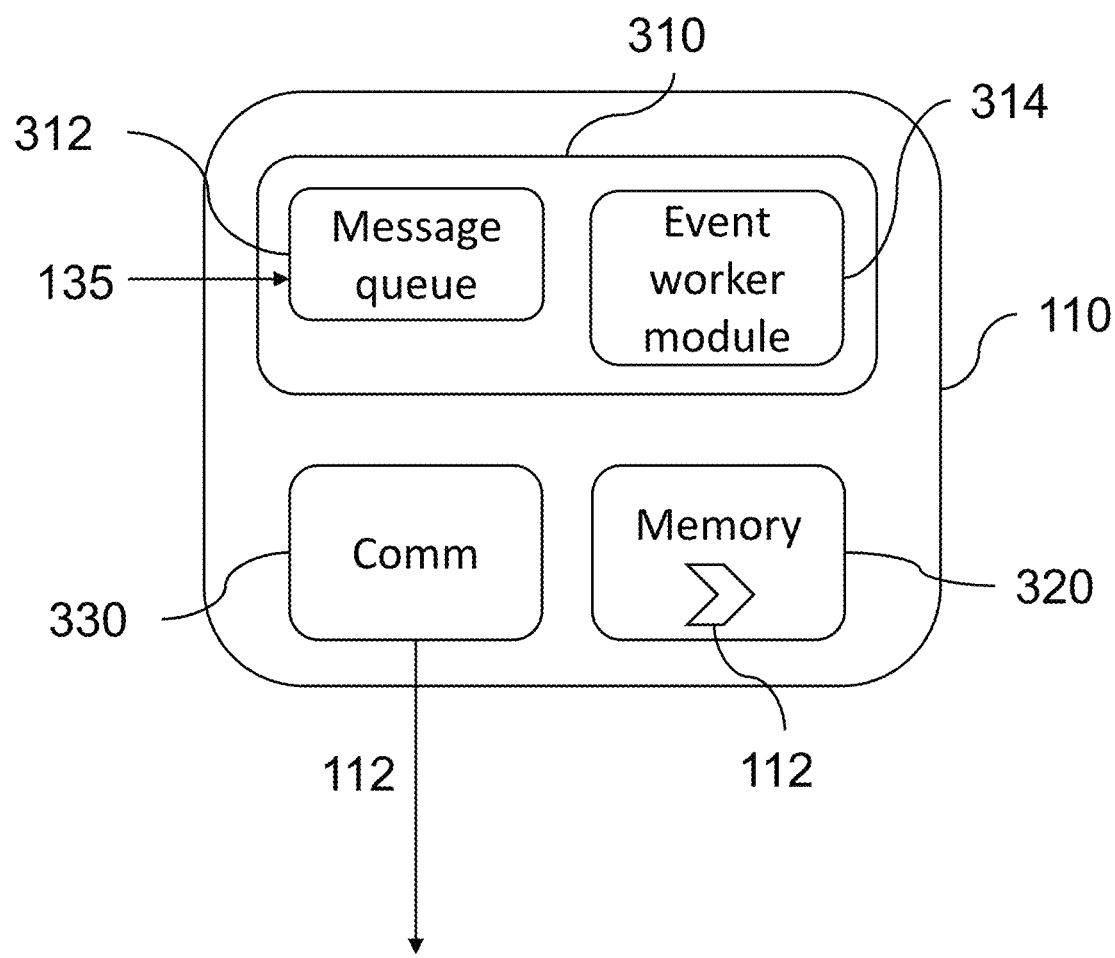
FIG. 3 is a block diagram of a primary server 110.

With reference to FIG. 3, there is shown a block diagram of the primary server 110. The primary server 110 comprises a memory device 320 configured to store the database 112, at least one processor 310 and a communication module 330. The primary server 110 is adapted to receive, via the message broker system, an indication of the request 135 to make a change to the database. The processor 310 of the primary server 110 is adapted to execute a message queue module 312. The message queue module 312 is arranged to communicate with the event bus 220 of the message broker system 200 and store each request 135 transmitted by the event bus 220.

The processor 310 of the primary server 110 further comprises an event worker module 314 adapted to process each request 135 by updating the database 112 stored in the memory 320. The event worker module 314 of the primary server 110 actively processes each request 135 in the message queue 312 as each request 135 is received, thereby updating the database 112 responsive to the request 135 being made by the client device. A copy of the updated database 112 is communicated by the communication module 330 to the secondary server 120 periodically to provide a backup of the database 112, as has been explained.

Figure 4:
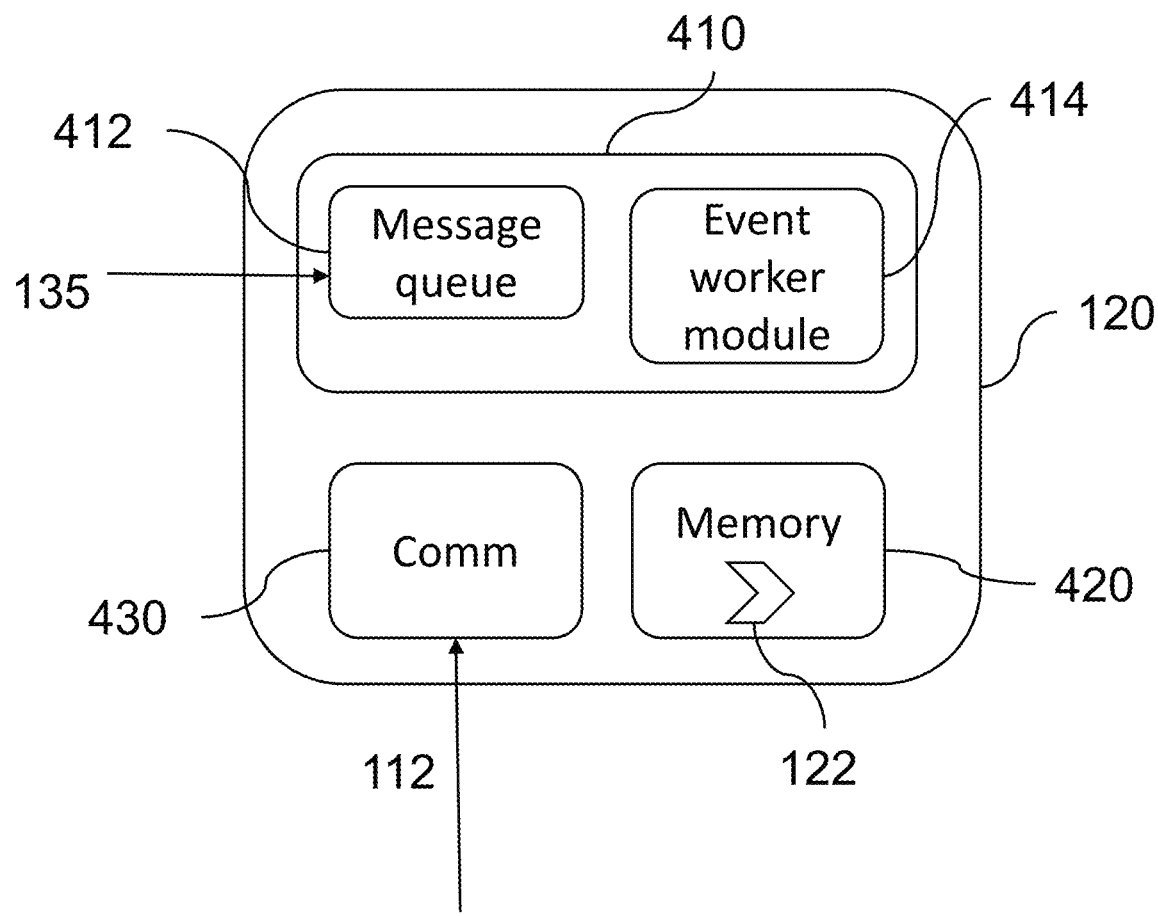
FIG. 4 is a block diagram of a secondary server 120.

With reference to FIG. 4, there is shown a block diagram of the secondary server 120. The secondary server 120 comprises a memory device 420 configured to store the last received snapshot 122 of the database, a processor 410 and a communication module 430 configured to periodically receive the snapshot of the database 112 from the primary server 110. The secondary server 120 is adapted to receive, via the message broker system, an indication of the request 135 to make a change to the database. The processor 410 of the secondary server 120 is adapted to execute a message queue module 412. The message queue module 412 is arranged to communicate with the event bus 220 of the message broker system 200 and store each request 135 transmitted by the event bus 220. Thus, each request 135 is transmitted to a message queue at each server in the database system via the message broker mechanism.

The processor 410 of the secondary server 120 further comprises an event worker module 414. In contrast to the primary server 110, the event worker module 414 of the secondary server 120 is arranged to remain inactive in the absence of a disaster recovery event. That is, during normal operation, the event worker module 414 is deactivated and each request 135 is logged in the message queue 412 without being processed. Thus, the secondary server 120 stores a snapshot 122 of the database, and any request 135 to process the database between snapshots is effectively stored in the message queue without being actively processed.

Figure 5:
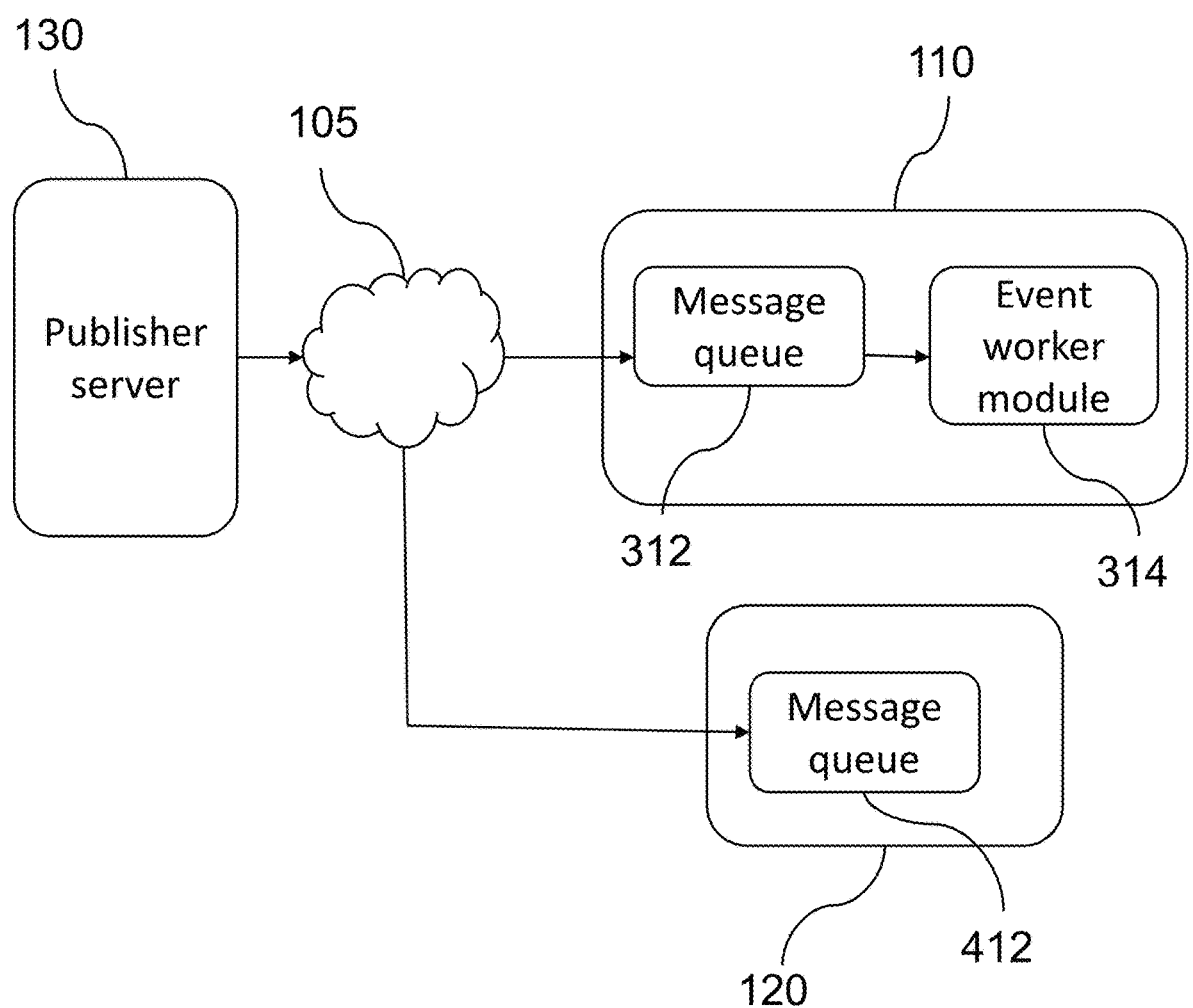
FIG. 5 is a schematic illustration of a communication of a request in the database system 100.

With reference to FIG. 5, there is shown a schematic illustration of a communication path through the system 100 for a received request 135. The request 135 received by the publisher server 130 is transmitted using the publish-subscribe system 200, e.g. via the one or more networks 105, to each subscriber including the message queue 312 at the primary server 110 and the message queue 412 at the secondary server 120. At the primary server 110, the request 135 logged in the message queue 312 is communicated to the event worker module 314 which updates the database 112 to process the requested change. At the secondary server, the request is simply retained in the message queue 412 and the snapshot 122 is not processed.

In this way, even though the event worker module 414 is deactivated at the secondary server 120, the use of the message broker system 200 means that up to date changes for the database can be stored in the message queue 412. This means that the secondary server 120 at all times comprises sufficient information to reproduce an up to date version of the database 112 in the case of data loss at the primary server 110. The message broker system 200 transmits each change to both the primary server 110 and secondary server 120, ensuring that all changes processed at the primary server 110 are also comprised in the message queue 412 of the secondary server 120.

In the case of a disaster recovery (DR) event resulting in data loss at the primary server 110, an indication of the DR event is communicated to the secondary server 120. Upon receipt of the indication of the DR event, the secondary server 120 is configured to construct an up to date version of the database 112 from the snapshot 122 by processing the requested changes stored in the message queue 412. In this way, even if changes have been made to the database 112 at the primary server 110 between snapshots, these changes will not be lost in the case of a DR event as they are necessarily transmitted to the secondary server 120 as part of the message broker system 200 and thus may be processed at the secondary server 120 to incorporate those changes if required.

Figure 6:
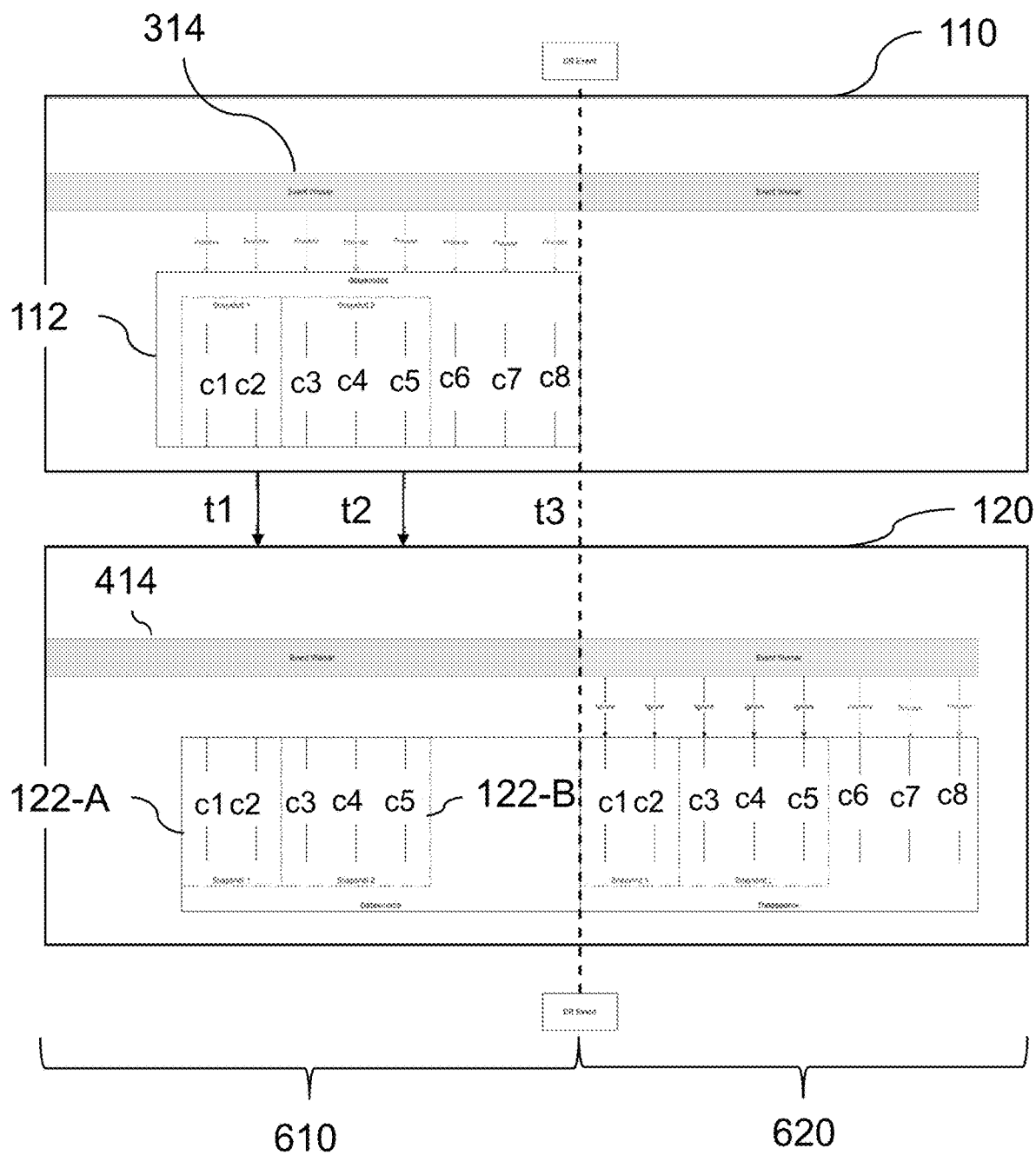
FIG. 6 illustrates an example disaster recovery event.

With reference to FIG. 6, there is shown an illustration of the processing performed by the event worker 314, 414 at each of the primary server 110 and secondary server 120 during a disaster recovery (DR) event according to an embodiment. During a first period 610, a number of requests 135 are received by the publisher server 130 to make changes c1-c8 to the database 112. The requests to make changes c1-c8 are each transmitted to the message queue 312 of the primary server 110 and the message queue 412 of the secondary server 120. During the first period 610, the primary server 110 is functioning normally. Each request 135 received by the message queue 312 is actively processed by the event worker module 314 of the primary server 110 to update the database 112 with each change c1-c8. As the primary server 110 is functioning as normal, the event worker 414 of the secondary server 120 may be deactivated as the changes do not need to be actively processed at the secondary server 120 during the first time period 610. At a first time point t1, a first snapshot 122-A of the database 112 is captured and transmitted to the secondary server 120 including the changes c1 and c2 processed by the event worker 314 before the time t1. At a second time point t2, a second snapshot 122-B of the database 112 is captured and transmitted to the secondary server 120. The second snapshot 122-B incorporates three changes c3, c4 and c5 made to the database 112 at the primary server 110 between the first time point t1 and the second time point t2.

At a third time point t3, a disaster recovery (DR) event occurs. Three changes c6, c7 and c8 have been made to the database 112 at the primary server 120 between time points t2 and t3 and thus these changes are not present in the most recent snapshot 122-B stored at the secondary server 120. An indication of the DR event is transmitted to the secondary server 120. In response to receiving the indication of the DR event, during a second time period 620 the event worker 414 of the secondary server 120 may be activated and retrieve each request 135 stored in the message queue 412 of the secondary server 120. The snapshot 122-B of the database stored in the secondary server 120 may then be updated by the event worker 414 processing the changes c6-c8 stored in the message queue 412. Thus, the secondary server 120 can provide an up to date backup of the database 112 using a snapshot-based system having zero data loss even when changes are made to the database between the snapshot and the DR event.

Figure 7:
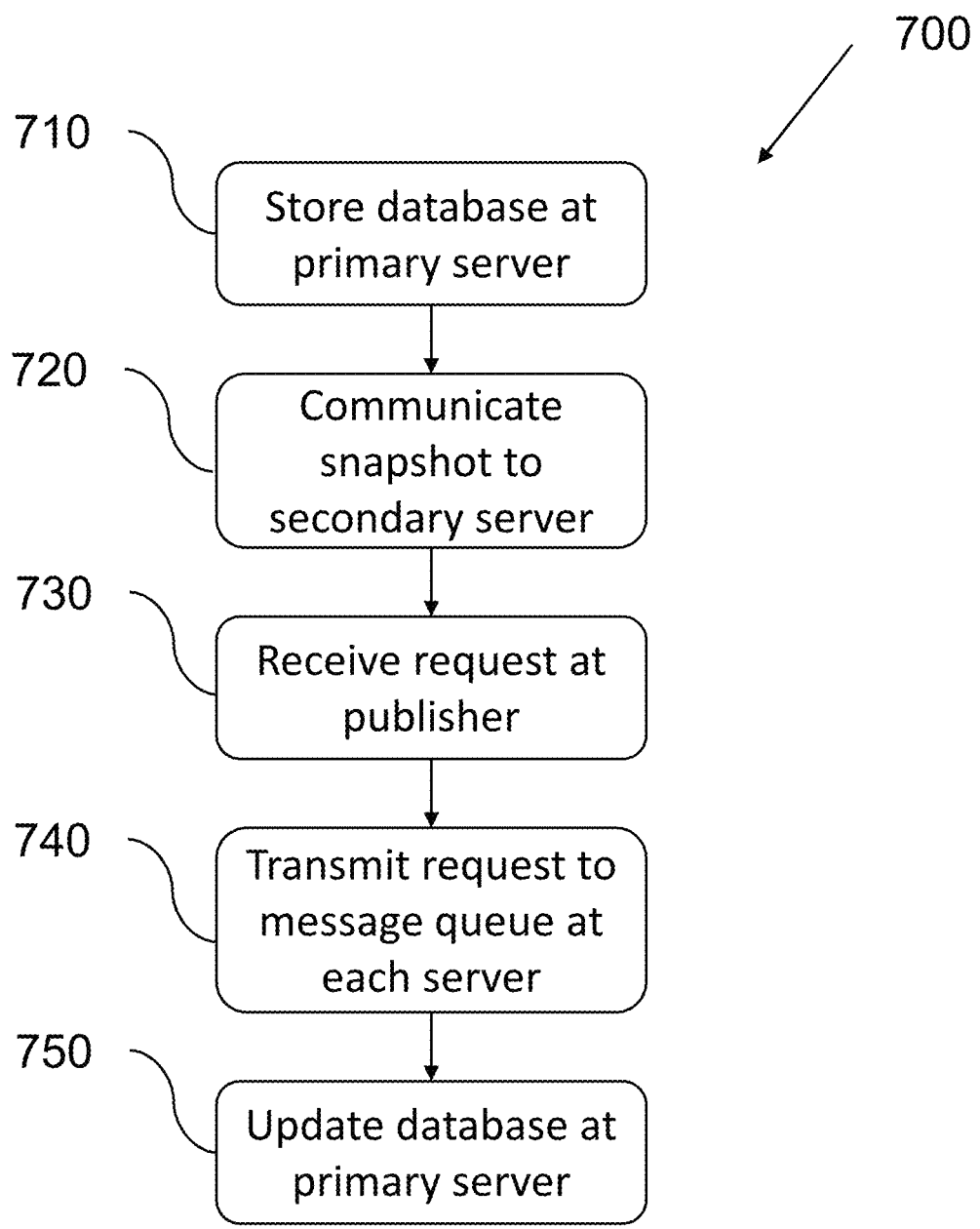
FIG. 7 shows a flow chart of a method 700.

With reference to FIG. 7, there is shown a flow chart of a method 700 for providing a backup for a database system, such as the database system 100.

In block 710, a database 112 is stored at the primary server 110. In block 720, a snapshot 122 of the database 112 is communicated from the primary server 110 to the secondary server 120. The snapshot 122 is stored at the secondary server 120 which thereby provides a backup of the database 112 in case of a disaster recovery (DR) event. The snapshot 122 may be a complete copy of the database 112 or may be incremental. By incremental it is meant that the snapshot 122 may only comprise a subset of the database which differs from the previous snapshot 122. In this way, redundant information need not be communicated. Block 720 may be performed periodically, that is a current snapshot of the database may be periodically communicated from the primary server 110 to the secondary server 120 in order to update the backup. Block 720 may be performed every predetermined period, such as every hour, two hours, 30 minutes or the like. In some embodiments, there may be multiple primary servers 110 and/or multiple secondary servers 120. Thus, the blocks associated with the primary server 110 and secondary server 120 may be performed for each server in these embodiments.

In block 730, a request 135 to make a change to the database 112 is received at the publisher server 130. As discussed, the publisher server 130 may be integrated with the primary server 110 or may be separate. The publisher server 130 is configured to execute a publisher module which functions as a publisher in a message broker system such as a publish-subscribe system.

In block 740, the publisher server 130 is configured to transmit the request to the message queue 312 of the primary server 110 and the message queue 412 of the secondary server using the message broker system. As discussed, the message broker system may utilise an intermediary element such as the event bus 220 shown in FIG. 2, and thus the transmitting of block 740 may be indirect. The system is readily scalable due to the nature of message broker technology, in particular publish-subscribe technology, and thus the system can be easily scaled to a large number of primary or secondary servers in a distributed system.

In block 750, the event worker module 314 of the primary server 110 updates the database 112 at the primary server 110 by processing the requested change. Conversely, in the secondary server 120 the event worker module 414 may be inactive in order to reduce the processing burden of the system. Blocks 730 to 750 may be performed each time a request 135 is made by a client device.

Figure 8:
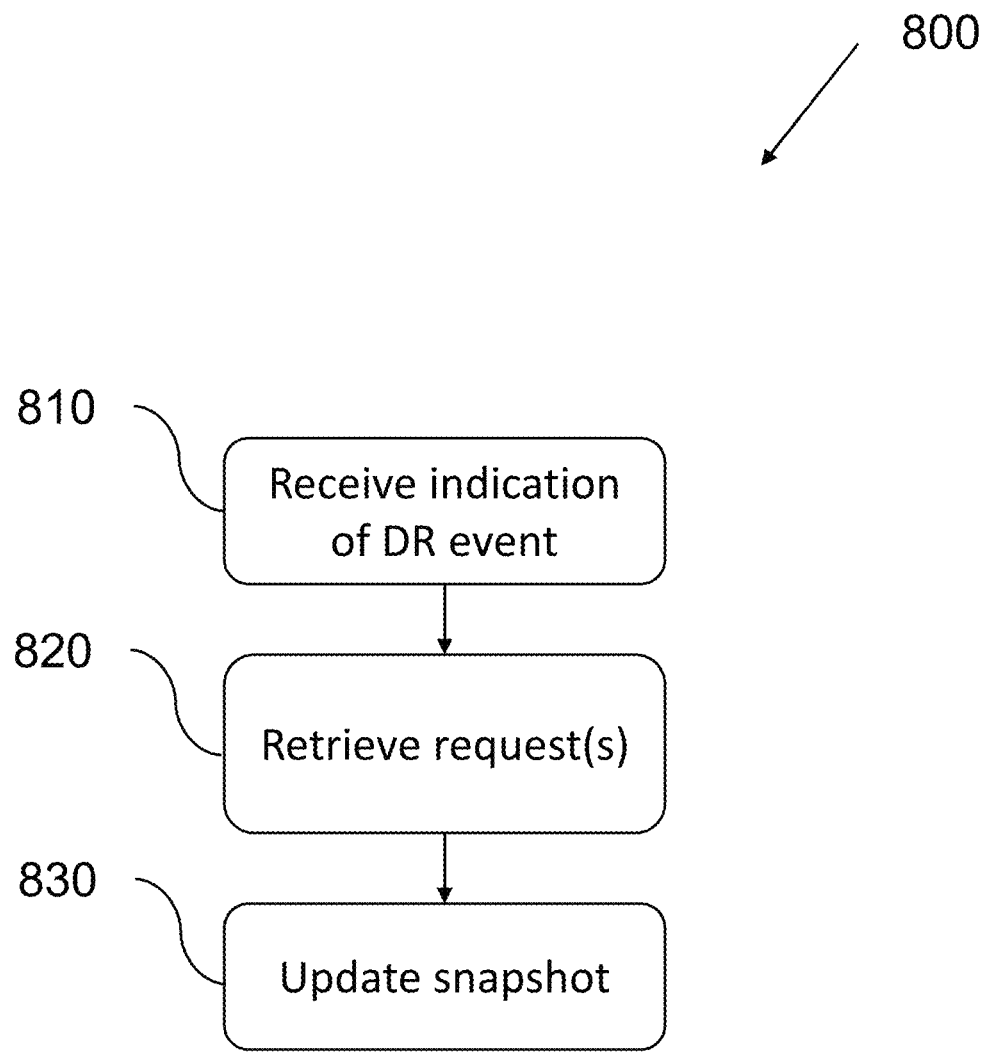
FIG. 8 shows a flow chart of a method 800.

With reference to FIG. 8, there is illustrated a method 800 which may be performed following a DR event at the primary server 110. In block 810, an indication of a DR event is received at the secondary server 120. In block 820, the requests to make changes to the database 112 are retrieved from the message queue 412. The event worker module 414 of the secondary server 120 is then activated in order to process the requests. In block 830, the event worker module 414 is then configured to update the snapshot 122 of the database stored at the secondary server 120 by processing each requested change. In some embodiments, the system may be designed such that in block 830 only requests transmitted to the message queue 412 since the last snapshot 122 was received are processed, in order to ensure requests are not processed in duplicate. This may be achieved for example by designing the requests to have idempotence, or by clearing the message queue 412 when each snapshot 122 is received.

It will be appreciated that in large, multi-tenant database systems, a large volume of requests may be processed and thus a large number of requests may occur between snapshots. Thus, in traditional snapshot based systems, the chance of data loss or corruption following a DR event is high. However, the large volume of transactions also mean that implementing a multi-master system having an active secondary server 120 processing requests is extremely resource intensive. Thus, the present invention provides a resource efficient DR method which may be used in any snapshot based database technology, whilst ensuring zero data loss.

The term 'processor' is to be interpreted broadly to include a CPU, processing unit, ASIC, logic unit, or programmable gate array etc, and may refer to a single processor or a combination of several processors. Certain aspects of the disclosure may be implemented using machine-readable instructions which may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The functional modules may be implemented in a single processor or divided amongst several processors.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method of providing a backup for a database system, the method comprising:
storing, at a primary server, a database;
communicating, from the primary server to a secondary server, a snapshot of the database, and storing the snapshot of the database at the secondary server;
receiving, at a publisher server, at least one request to make a change to the database;
transmitting the at least one request from the publisher server to each of a message queue associated with the primary server and a message queue associated with the secondary server;
updating the database at the primary server by processing each requested change; and
updating the snapshot of the database at the secondary server according to the message queue associated with the secondary server based on receiving an indication of a disaster recovery event at the primary server.

2. The method of claim 1, further comprising:
receiving, at the secondary server, the indication of the disaster recovery event at the primary server;
retrieving from the message queue associated with the secondary server, the at least one request; and
in response to receiving the indication of the disaster recovery event, updating the snapshot of the database at the secondary server by processing the at least one requested change.

3. The method of claim 2, wherein updating the snapshot of the database at the secondary server comprises processing each request transmitted to the message queue since communication of the snapshot.

4. The method of claim 1, wherein transmitting the request comprises transmitting the request from the publisher server using a fan-out mechanism.

5. The method of claim 4, wherein the fan-out mechanism comprises a publish-subscribe (pub/sub) mechanism.

6. The method of claim 1, wherein a current snapshot of the database is periodically communicated from the primary server to the secondary server.

7. The method of claim 1, comprising communicating the snapshot to one or more additional secondary servers; and
transmitting the at least one request from the publisher server to a respective message queue associated with each additional secondary server.

8. The method of claim 1, wherein the primary server is located at a first geographic region and the secondary server is located at a second geographic region different to the first geographic region.

9. A non-transitory computer-readable data storage medium storing computer-readable instructions which, when executed by one or more processors, perform a method comprising steps of:
storing, at a primary server, a database;
communicating, from the primary server to a secondary server, a snapshot of the database, and storing the snapshot of the database at the secondary server;
receiving, at a publisher server, at least one request to make a change to the database;
transmitting the at least one request from the publisher server to each of a message queue associated with the primary server and a message queue associated with the secondary server;
updating the database at the primary server by processing each requested change; and
updating the snapshot of the database at the secondary server according to the message queue associated with the secondary server based on receiving an indication of a disaster recovery event at the primary server.

10. A secondary server for providing a backup for a database system, the secondary server system comprising:
a communication module arranged to receive, from a primary server, a snapshot of a database stored at the primary server;
a memory device arranged to store the snapshot of the database and a message queue; and
one or more processors configured to receive at least one request to make a change to the database and store the at least one request in the message queue, wherein the at least one request is processed according to the message queue based on receiving an indication of a disaster recovery event at the primary server.

11. A database system for providing a backup database, the database system comprising:
a primary server configured to store a database;
a secondary server configured to store a snapshot of the database, wherein the primary server is configured to communicate the snapshot of the database to the secondary server; and
a publisher server configured to receive at least one request to make a change to the database and transmit the at least one request to each of a message queue associated with the primary server and a message queue associated with the secondary server;
wherein the primary server is configured to update the database by processing each requested change and to update the snapshot of the database at the secondary server based on receiving an indication of a disaster recovery event at the primary server.

12. The database system of claim 11, wherein the secondary server is configured to:
receive the indication of the disaster recovery event at the primary server;
retrieve from the message queue associated with the secondary server, the at least one request; and
in response to receiving the indication of the disaster recovery event, update the snapshot of the database at the secondary server by processing the at least one requested change.

13. The database system of claim 12, wherein the secondary server is configured to update the snapshot of the database by processing each request transmitted to the message queue since communication of the snapshot.

14. The database system of claim 11, wherein the publisher server is configured to transmit the request using a fan-out mechanism.

15. The database system of claim 14, wherein the fan-out mechanism comprises a publish-subscribe (pub/sub) mechanism.

16. The database system of claim 11, wherein the publisher server is comprised in the primary server.

17. The database system of claim 11, wherein the primary server is configured to periodically communicate a current snapshot of the database to the secondary server.

18. The database system of claim 11, comprising one or more additional secondary servers, wherein:
- the primary server is configured to communicate the snapshot to each of the one or more additional secondary servers; and
- the publisher server is configured to transmit the at least one request from the to a respective message queue associated with each additional secondary server.

19. The database system of claim 11, wherein the primary server comprises a distributed server system.

20. The database system of claim 11, wherein the primary server is located at a first geographic region and the secondary server is located at a second geographic region different to the first geographic region.

* * * * *